United States Patent

Sonozaki et al.

[11] Patent Number: 6,106,973
[45] Date of Patent: Aug. 22, 2000

[54] THIN TYPE BATTERY WITH LAMINATED SHEATHING

[75] Inventors: Tsutomu Sonozaki, Tsuna-gun; Takanori Fujii; Ikurou Nakane, both of Sumoto; Kazuo Teraji, Yawata; Satoshi Narukawa, Sumoto, all of Japan

[73] Assignee: Sanyo Electric Co., Ltd., Moriguchi, Japan

[21] Appl. No.: 08/979,258

[22] Filed: Nov. 26, 1997

[30] Foreign Application Priority Data

Nov. 28, 1996 [JP] Japan ................................. 8-317727
Nov. 21, 1997 [JP] Japan ................................. 9-320989

[51] Int. Cl.[7] ............................. H01M 6/46; H01M 2/02
[52] U.S. Cl. ......................... 429/162; 429/127; 429/163
[58] Field of Search .................... 429/162, 163, 429/127

[56] References Cited

U.S. PATENT DOCUMENTS

| | | | |
|---|---|---|---|
| 3,734,780 | 5/1973 | Bilhorn et al. | 429/162 |
| 4,092,464 | 5/1978 | Dey et al. | 429/127 |
| 4,623,598 | 11/1986 | Waki et al. | 429/162 |
| 4,758,482 | 7/1988 | Yamana et al. | 429/163 |
| 4,997,732 | 3/1991 | Austin et al. | 429/163 |
| 5,227,264 | 7/1993 | Duval et al. | 429/162 |
| 5,422,200 | 6/1995 | Hope et al. | 429/163 |
| 6,048,639 | 4/2000 | Sonozaki et al. | |

FOREIGN PATENT DOCUMENTS 60-211763 10/1985 Japan.
8-83596 3/1996 Japan.

*Primary Examiner*—Maria Nuzzolillo
*Assistant Examiner*—Susy Tsang
*Attorney, Agent, or Firm*—Wenderoth, Lind & Ponack, L.L.P.

[57] ABSTRACT

A thin type battery having a electricity generating element disposed in a sealed chamber formed by a laminated sheathing. The laminated sheathing forms the sealed chamber by overlapping and airtightly adhering opposing surfaces of the laminated films at a primary sealing area and at a secondary sealing area which is perpendicular to the direction of the primary sealing area. Collector terminals are connected to a positive electrode and to a negative electrode of the electricity generating element. The collector terminal are airtightly crimped in the secondary sealing area of the laminated sheathing. Also, the collector terminals extend outwardly of the laminated sheathing. The primary sealing part of the laminated sheathing is located over a surface of the electricity generating element.

14 Claims, 16 Drawing Sheets

THIN TYPE BATTERY WITH LAMINATED SHEATHING

BACKGROUND OF THE INVENTION

The present invention relates to a thin type battery using a laminated sheathing and particularly to a thin type battery with a sealing part having a novel structure.

A thin type battery with a laminated sheathing is shown in the plan view of FIG. 1 and in the cross sectional view of FIG. 2. The thin type battery shown in these figures has an electricity generating element 7 housed in the laminated sheathing 5. An electrolytic layer 3 is interposed between a positive electrode 1 and a negative electrode 2 of the electricity generating element 7. Adjacent an outer circumference of the electricity generating element 7 of the thin type battery is a sealing part 4 of the laminated sheathing 5. The laminated sheathing 5 airtightly seals the electricity generating element 7 and includes two laminated films 5A on both sides of the electricity generating element 7. The outer circumference of the films 5A are heat welded, and at that time, collector terminals 6, which are electrically connected to the positive electrode 1 and to the negative electrode 2, are pulled outwardly of the laminated sheathing 5. Note, that it is important that the laminated sheathing 5 airtightly seals the electricity generating element 7. In particular, it is important that the seal is airtight to prevent the introduction of atmospheric moisture inside the sealed battery. The following items are important in preventing the introduction of moisture inside the laminated sheathing 5.

1) A laminated film with a low moisture transmission rate must be used.
2) The seal must prevent the introduction of moisture.

To lower moisture transmission of the laminated film 5A, the laminated film 5A is composed of a polyester film 5a which is laminated on one face of an aluminum layer 5b and of a polypropylene film 5c which is laminated on the other side. In comparison to a plastic film, the aluminum layer 5b has an excellent property of limiting the transmission rate of moisture. However, because the aluminum layer 5b cannot be heat welded, the polypropylene film 5c, which can be heat welded, is laminated on the inner face of the aluminum layer 5b. Also, to protect the aluminum layer 5b, the polyester film 5a is laminated on the outer face of the aluminum layer 5b.

To prevent the introduction of moisture through the sealing part 4, the laminated sheathing needs to augment the width of the sealing part 4. As shown in the cross-sectional view of FIG. 3, the width of the sealing part 4 is narrow, and thus moisture can enter the inside of the battery by passing through the polypropylene film 5c that is laminated on the inner face of the aluminum layer 5b. Thus, the sealing part 4 is a structure that cannot prevent moisture transmission by the aluminum layer 5b. Since the polypropylene films 5c are crimped or sandwiched between the aluminum layers 5b, moisture is able to penetrate the polypropylene films 5c. In comparison to the aluminum layer 5b, the polypropylene film 5c has a fairly large moisture transmission rate. For this reason, the width of heat weld formed by the polypropylene film 5c is made fairly large. In other words, in order to reduce moisture transmission, it is necessary lengthen the distance that the moisture will have to travel the seal. For this reason, it is not possible to have a laminated sheathing 5 with a narrow sealing part 4.

Accordingly, the thin type battery which has a wide sealing part at the outer circumference of the electricity generating element, has an electricity generating element which is small compared to the external size of the battery. For this reason, the drawback is that the electric discharge capacity of the battery is reduced. However, if the width of the sealing part is made narrower, the moisture etc., can more easily penetrate interiorly of the battery by passing through the polypropylene films of the sealed portion.

The present invention has been developed in order to solve these drawbacks. The important object of the present invention is to improve the seal provided by the sealing part of the laminated sheathing and also to provide a thin type battery with a laminated sheathing which has a small overall outer size and a large electric discharge capacity.

SUMMARY OF THE INVENTION

The thin type battery of the present invention is provided with a laminated sheathing, an electricity generating element and collector terminals. The laminated sheathing is composed of a laminated film which is overlapped and airtightly glued at a primary sealing part and at a secondary sealing part that is oriented perpendicularly to the primary sealing part so as to form a sealed chamber. The electricity generating element has a positive electrode and a negative electrode and is located inside of the sealed chamber formed by the laminated sheathing. The collector terminals are connected to the positive electrode and to the negative electrode of the electricity generating element and are also airtightly crimped to the secondary sealing part of the laminated sheathing. Also, collector terminals protrude outside of the laminated sheathing. Furthermore, the primary sealing part of the laminated sheathing is located over an upper surface of the electricity generating element.

In the present invention, the secondary sealing part refers to the sealing part that crimps airtightly the collector terminals of the electricity generating element and also refers to the sealing part that extends parallel to the seal through which the collector terminals extend. The primary sealing part refers to the sealing part which extends perpendicularly to the secondary sealing part.

The thin type battery having the above-described structure has the characteristics of not only providing an effective seal at the sealing parts of the laminated sheathing, but also of making the battery smaller but with a larger electric discharge capacity. This is because the primary sealing part is formed by heat sealing the overlapped laminated films over an upper surface of the electricity generating element. The sealing part located over the surface of the electricity generating element does not increase the external shape of the battery even if the width of the sealed area is made larger. Therefore, the thin type battery of this structure can have a wide sealing part as well as a larger electricity generating element. Thus, a sheathing, is provided which can efficiently prevent the penetration of moisture etc. through the laminated films, while reducing the loss of efficiency of the battery. Further, being able to make the electricity generating element larger allows the battery capacity to be improved.

The above and further objects and features of the invention will be more fully apparent from the following detail description with reference to the accompanying drawings.

DETAILED DESCRIPTION OF THE INVENTION

Figure 4:
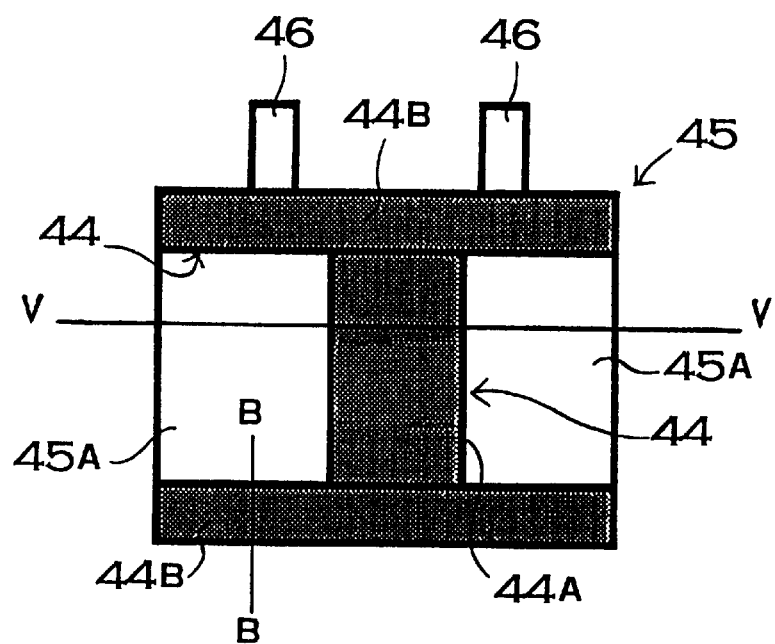
FIG. 4 is a plan view of a thin type battery having a laminated sheathing in accordance with an embodiment of the present invention.
Figure 5:
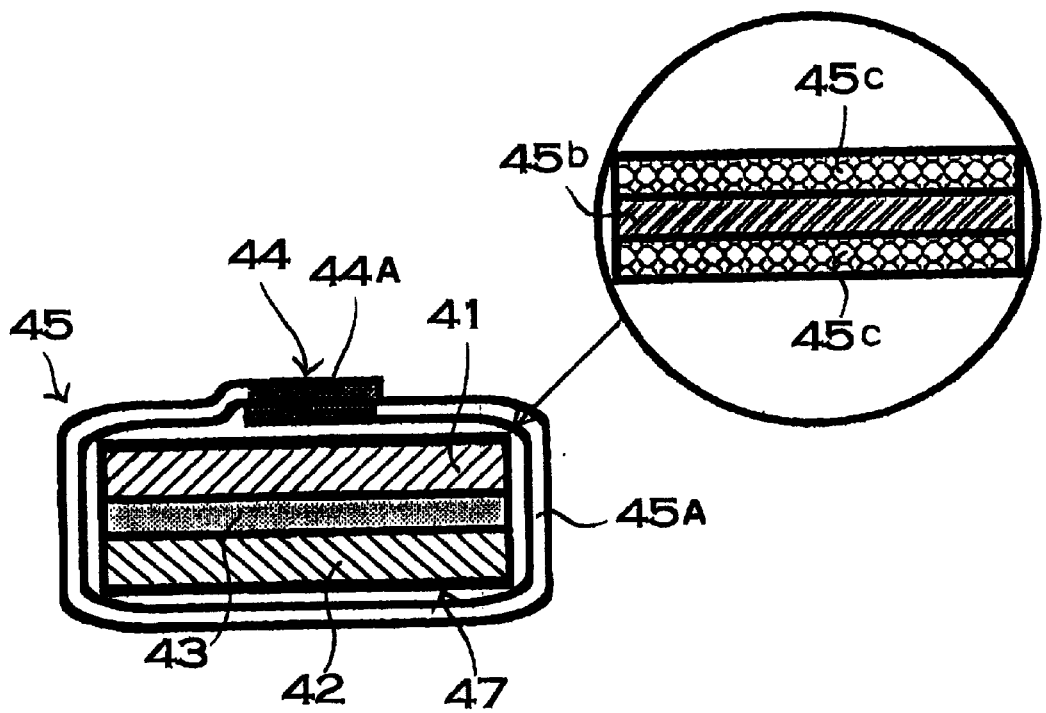
FIG. 5 is a cross-sectional view of the thin type battery shown in FIG. 4 taken along line V—V.
Figure 6:
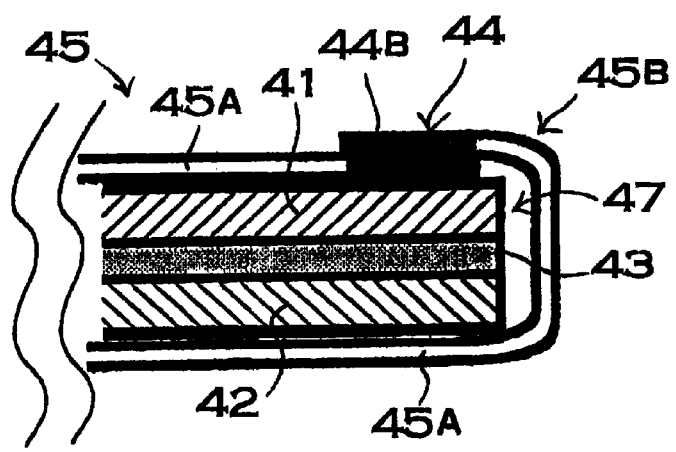
FIG. 6 is a cross-sectional view of the thin type battery shown in FIG. 4.

A thin type battery, shown in the FIGS. 4 to 6, has an electricity generating element 47 which is provided in the interior of a sealed chamber formed by a laminated sheathing 45. In FIGS. 4–7, reference numeral 41 denotes a positive electrode, 42 denotes a negative electrode, 43 denotes an electrolytic layer, 44 denotes a sealed part of the laminated sheathing, 45 denotes the laminated sheathing and 46 denotes the collector terminals.

The thin type battery is a lithium polymer rechargeable battery or a lithium ion rechargeable battery. The lithium polymer rechargeable battery uses a solid electrolyte or a gel type electrolyte at normal temperature. The lithium polymer rechargeable battery uses the following combinations as to the positive electrode and the negative electrode.

Positive electrode . . . Manganese acid lithium
Negative electrode . . . Graphite type carbon
Positive electrode . . . Vanadium oxide
Negative electrode . . . Lithium alloy The lithium ion rechargeable battery uses an electrolyte which is obtained from a solvent and a solute of $LiPF_6$ etc, the following can be used as to the positive and negative electrodes.

Positive electrode . . . Cobalt acid lithium
Negative electrode . . . Graphite type carbon
Positive electrode . . . Cobalt acid lithium
Negative electrode . . . Coke type carbon
Positive electrode . . . Nickel acid lithium
Negative electrode . . . Graphite type carbon
Positive electrode . . . Manganese acid lithium
Negative electrode . . . Graphite type carbon
Positive electrode . . . Cobalt acid lithium
Negative electrode . . . Tin amorphous oxide The laminated sheathing 45 surrounds the electricity generating element 47 so as to form an air-tight sealed structure. Opposite end of the laminated film 45A are overlapped and heat welded to form sealing part 44. As shown in the enlarged cross-sectional view in FIG. 5, the laminated film 45A is a film formed by laminating polypropylene films 45c on both sides of an aluminum foil 45b.

The laminated film 45A shown in FIG. 5, is a three layer structure composed of a first or inner polypropylene film 45c, the aluminum foil 45b and a second or outer polypropylene film 45c. The polypropylene films 45c are laminated on opposite sides of the aluminum foil 45b.

Embodiment 1

The thin type battery that is a lithium polymer rechargeable battery or a lithium ion rechargeable battery, is manufactured as follows.

In the thin type battery, the thickness of each layer of the laminated film 45A is as follows: the primary polypropylene film 45c, located at the inner side of the laminated sheathing 45, is 50 μm; the aluminum foil 45b is 20 μm; and the secondary polypropylene film 45c, located at the external side of the laminated sheathing 45, is 80 μm. A metamerism state, of the polypropylene film is used to adhere or form the adhesive bond at the interface between the aluminum foil 45b and the polypropylene films 45c.

The thin type battery of FIGS. 4 to 6 is manufactured according to the following process.

(1) As shown in FIG. 5, the laminated film 45A is bent on both sides of the electricity generating element 47 and formed in a tubular shape, and both extremities are overlapped and heat welded at an upper surface of the electricity generating element 47. By this process, the heat sealed area of the laminated film 45A becomes the primary sealed part 44A that connects the laminated film 45A in a tubular shape. The overlapping part of the laminated film 45A is heat welded before introducing the electricity generating element 47. Nevertheless the overlapping portions that become the primary sealed part 44A can also be heat welded after having introduced the electricity generating element 47. The method of heat welding the overlapping portions before introducing the electricity generating element 47, allows both faces of the overlapping part to be crimped and heat welded by means of a metallic mold of a high frequency induction heating apparatus. The method of heat welding after having introduced the electricity generating element allows the overlapping portions to be pressed and welded at the surface of the electricity generating element 47 by means of the heated mold. The primary sealing part 44A is heat welded so as to have a width of 20 mm.

Figure 7:
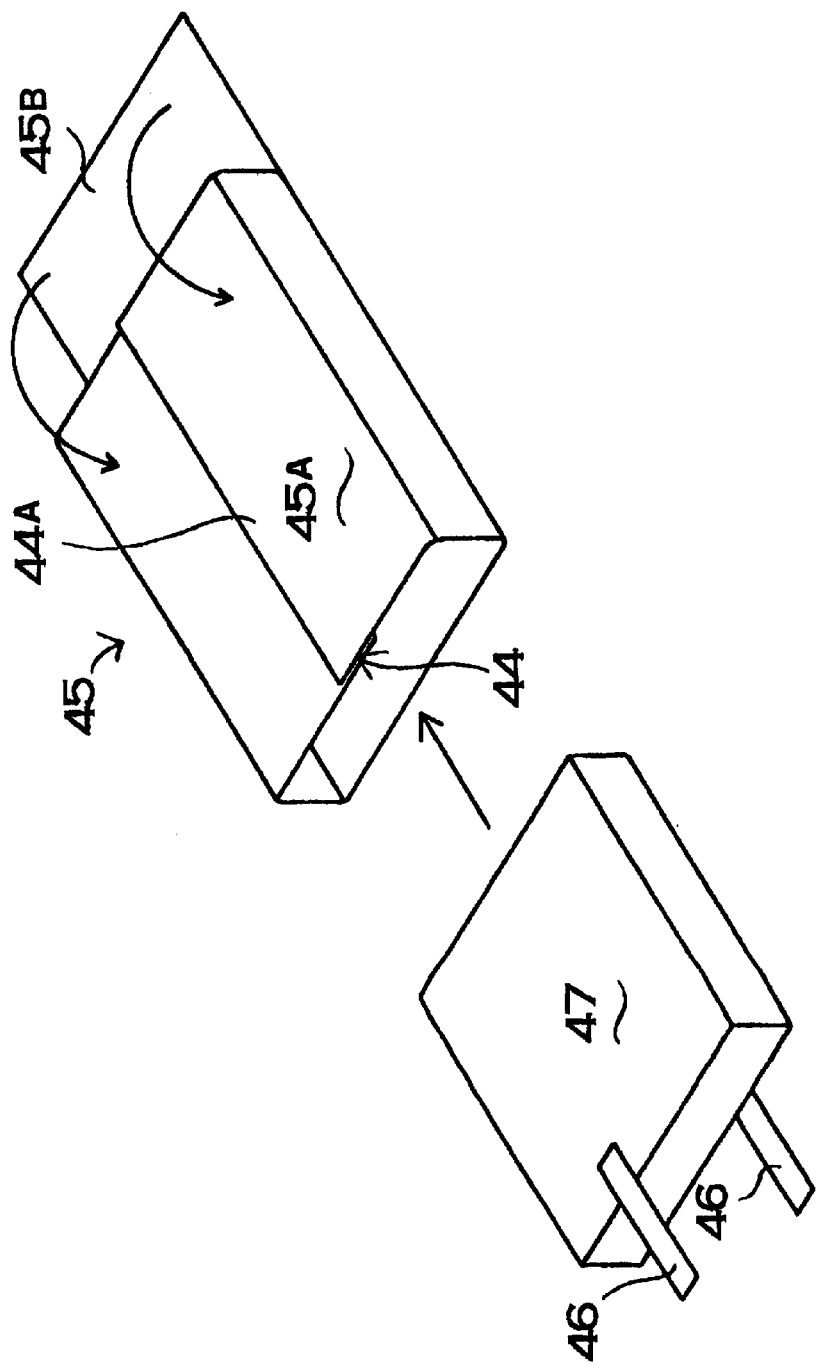
FIG. 7 is a perspective view showing a manufacturing process of the thin type battery shown in FIG. 4.

(2) Then, as shown in the FIG. 7, one extremity of the laminated film 45A that has been cylindrically heat welded, is folded and heat welded by means of the metallic mold of the high frequency induction heating apparatus. This portion of the heat seal 44 becomes the secondary sealing part 44B on the side that does not crimp the collector terminals 46. At the secondary sealing part 44B that does not crimp the collector terminals 46, the edge of one side of the laminated film 45A that is cylindrically connected, is removed by cutting, and the other flap 45B that has not been cut is overlapped and folded at 180 degrees so that it fits tightly on the surface of the cut off side of the laminated film 45A. The overlapping part is then heat welded and sealed so that the laminated sheathing is in the shape of a bag. The width of the secondary sealing part 44B is set at 20 mm. When heat sealing the flap 45B that is bent at 180 degrees, a thin metallic mold is introduced inside the laminated film 45A that has been connected in a tubular shape. The overlapping part is crimped and heat welded in a heated and pressed condition, by the mold and also by an external mold pressing the flap 45B.

Figure 8:
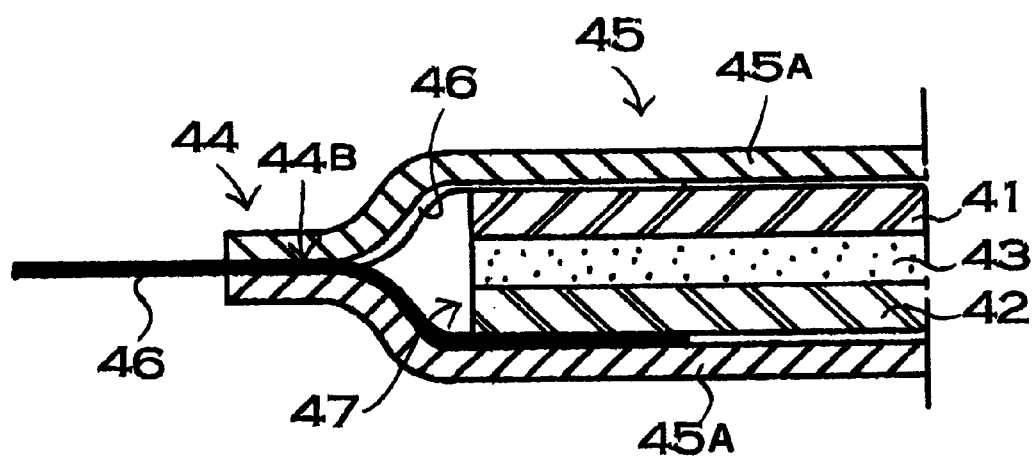
FIG. 8 is a cross-sectional view of the collector terminal part of the thin type battery shown in FIG. 4.

(3) The electricity generating element 47, which has been mounted or assembled in advance in an argon atmosphere, is introduced into the laminated film 45A with the overlapping part heat welded in the shape of a bag (hereinafter called pouch). The external dimensions of the electricity generating element are approximately 80×30 mm. As shown in FIG. 8, the collector terminals 46 of the positive electrode and the negative electrode are crimped between opposing surfaces of the laminated film 45A. The opposing surfaces of the laminated film 45A are heat welded. The collector terminals 46 are crimped or sandwiched between two layers of the laminated film 45A and extend outwardly therefrom. The width of the secondary sealing part 44B, which crimps and heat seals the collector terminals 46 is set at 10 mm.

The overall thickness of the thin type battery manufactured by the above-described process, is set at 1.5 mm.

Embodiment 2

Figure 9:
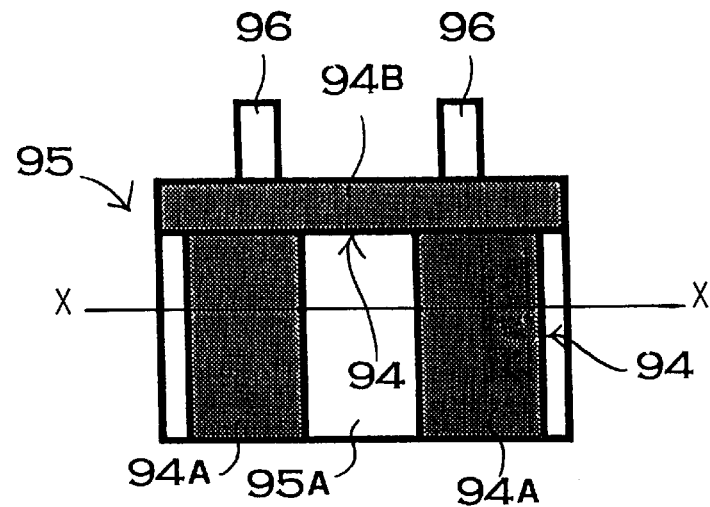
FIG. 9 is a plan view of the thin type battery constructed in accordance with another embodiment of the present invention.
Figure 10:
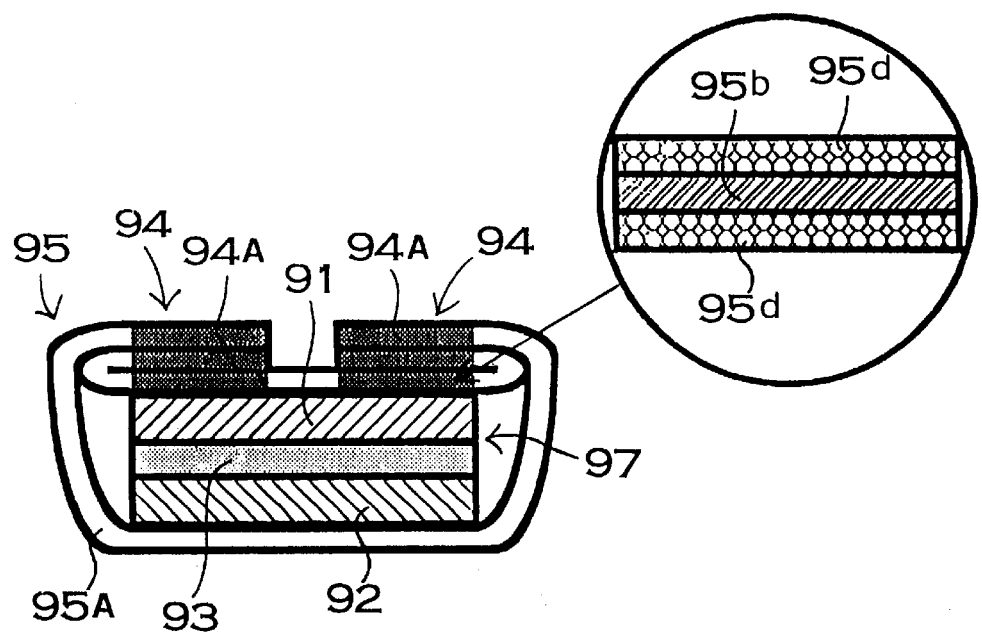
FIG. 10 is a cross-sectional view of the thin type battery shown in FIG. 9 taken along line X—X.

The thin type battery shown in FIG. 9 and FIG. 10, includes an electricity generating element 97 disposed in a laminated sheathing 95. The electricity generating element is the same as in the first embodiment. FIGS. 9 and 10 the positive electrode is numbered 91, the negative electrode 92, and the electrolytic layer 93. The sealing areas of the laminated film 95A are indicated by reference number 94.

The laminated film 95A has a three layer structure composed of a first polyethylene film 95d, an aluminum foil 95b and a second polyethylene film 95d. The polyethylene films 95d, laminated on opposite sides of the aluminum foil 95b, are made of the same material. In laminated film 95A, the primary polyethylene film 95d (inner side) is 30 μm thick, the aluminum foil 95b is 9 μm thick and the secondary polyethylene film 95d (external side) is 80 μm thick. A metamerism state of the films 95b is used to from the glued interface.

The thin type battery shown in the FIG. 9 and FIG. 10 is manufactured as follows.

Figure 11:
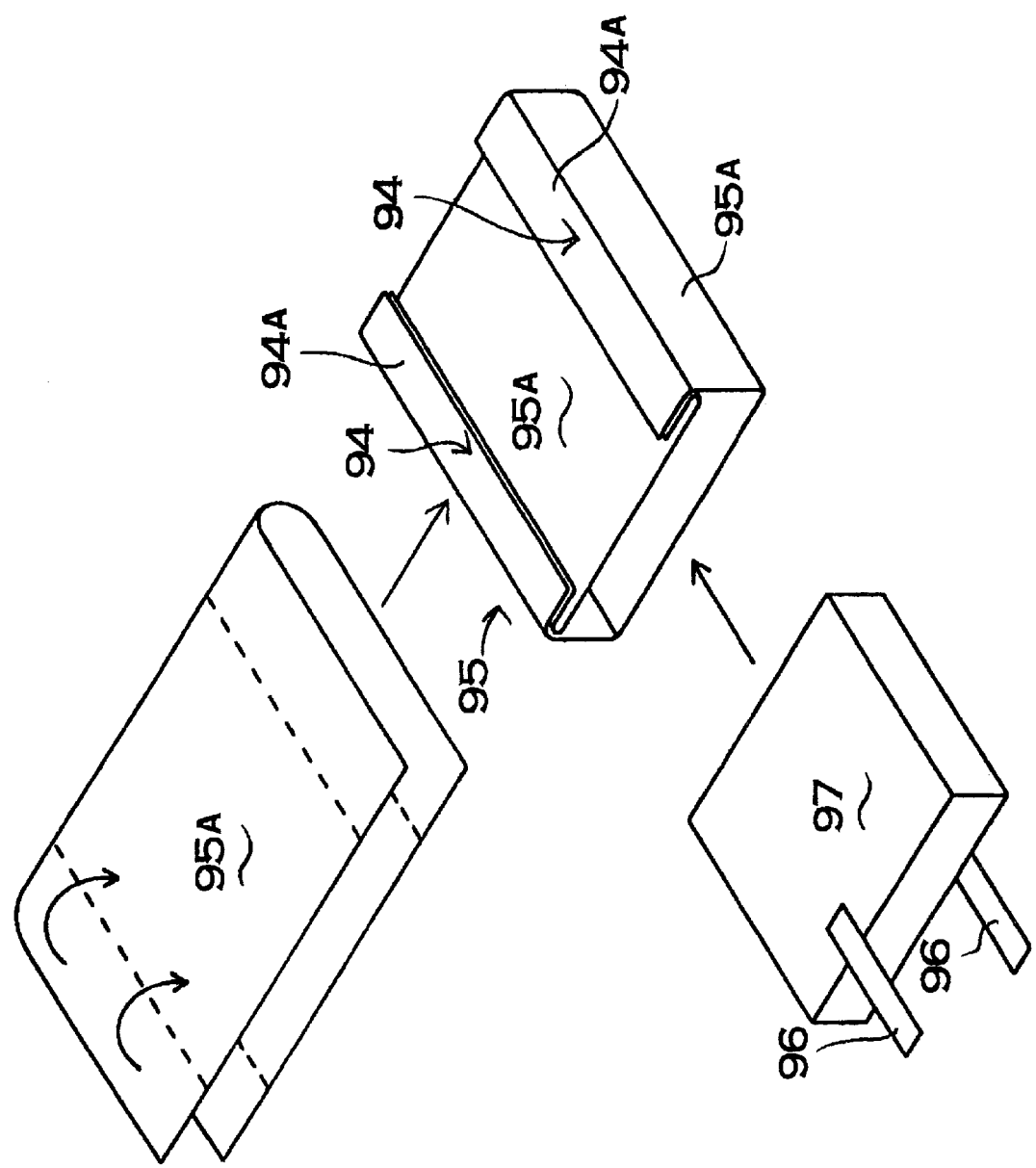
FIG. 11 is a perspective view showing the manufacturing process of the thin type battery shown in FIG. 9.

(1) As shown in FIG. 11, after having folded the laminated film 95A in two layers and after having folded extremities of overlapping parts at a position which overlies the upper face of the electricity generating element 97, the three layer laminated film 95A assumes the shape of a pouch by heat sealing the overlapping areas that have been overlapped, by means of the metallic mold of a high frequency induction heating apparatus. The width of a heat welded primary sealing part 94A is 20 mm. When heat sealing the overlapping portions at the upper face of the electricity generating element 97, a thin metallic mold is introduced in the pouch, in which where the electricity generating element 97 is to be introduced, to prevent heat sealing of the laminated film 95A located on opposite sides of the electricity generating element 97.

(2) Then the process is the same as that in the first embodiment, that is to say that the electricity generating element 97, that has been assembled in advance in an argon atmosphere, is introduced into the pouch which is now in the shape of a bag. The collector terminals of the positive electrode 91 and the negative electrode 92 are crimped or sandwiched between the laminated films 95A, and opposing surfaces of the laminated films 95A are heat welded. The width of the secondary sealing part 94B, which crimps and heat seals the collector terminals 96, is 10 mm.

The overall thickness of the thin type battery, manufactured in accordance with the above-described embodiment, is 1.7 mm.

Comparison Example

Figure 1:
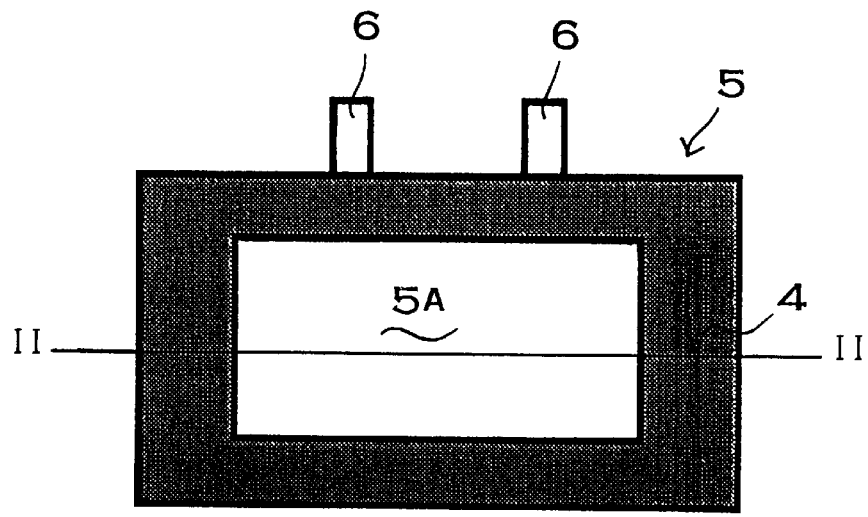
FIG. 1 is a plan view of a prior art thin type battery having a laminated sheathing taken alon line II—II.
Figure 2:
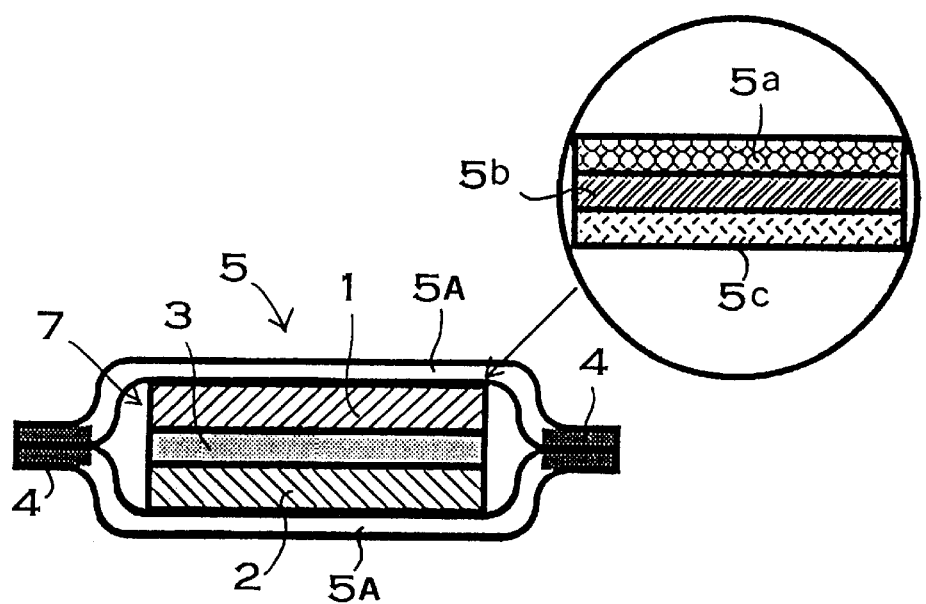
FIG. 2 is a cross-sectional view of the thin type battery shown in FIG. 1.
Figure 3:
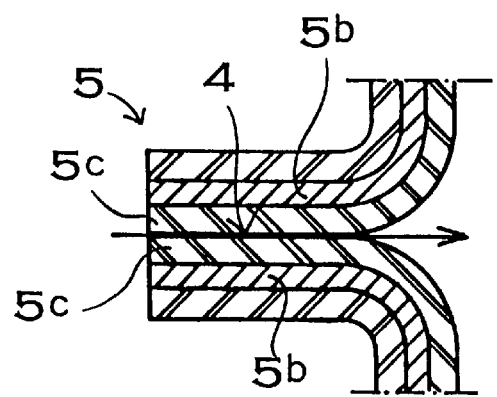
FIG. 3 is a cross-sectional view of the laminated sheathing of the thin type battery shown in FIG. 2.

A known thin type battery is manufactured, as shown in the FIG. 1 and FIG. 2, by heat welding laminated films 5A at the outer circumference of the electricity generating element 7. The electricity generating element 7 is the same as that in the first and second embodiment. The three layer structure of polyester film 5a, aluminum foil 5b and polypropylene film 5c comprise a 60 μm thick polypropylene film 5c, a 9 μm thick aluminum foil 5b and a 20 μm thick polyester film 5a. A urethane type glue is used to glue the interface. The laminated film 5A is heat welded so that the polyester film 5a is located outwardly. The width of the sealing part 4 which seals the overlapping portions of the laminated films 5A around the electricity generating element 7, is 10 mm. The electricity generating element 7, constructed in advance in an argon atmosphere, is introduced between the laminated films 5A. Then the laminated film 5A is heat welded around the periphery of the electricity generating element 7 so as to form the thin type battery. The thickness of the completed thin type battery was 1.5 mm.

Figure 12:
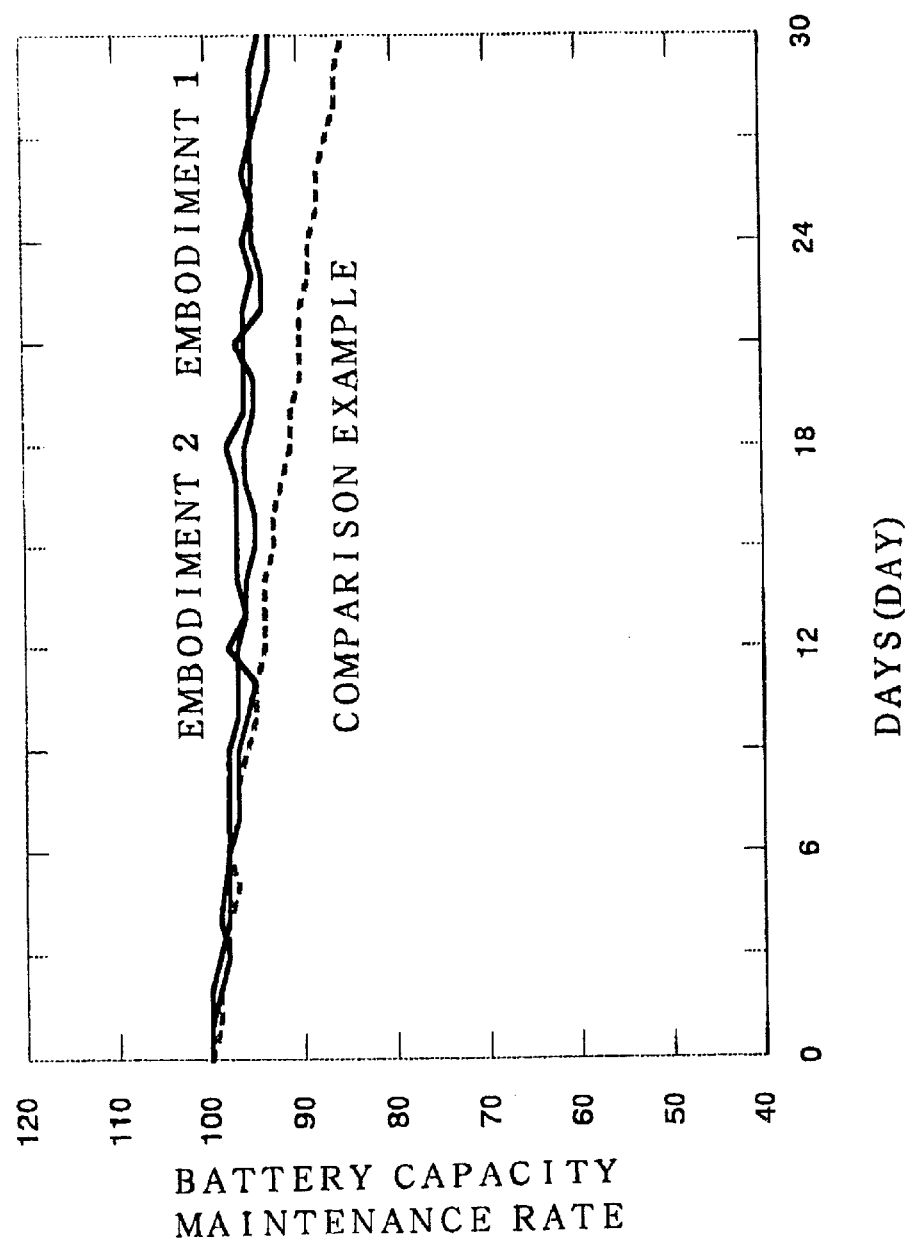
FIG. 12 is a graph showing the battery capacity maintenance rate.

The graph in FIG. 12 shows the battery capacity maintenance rates of the thin type batteries manufactured in accordance with the first and second embodiments and the comparison example. This graph compares the characteristics of the embodiments and the comparison example of the thin type batteries that is a lithium polymer rechargeable battery. From this diagram, the thin type batteries of the first and second embodiments of the present invention compared with the thin type battery of the comparison example, have battery capacity maintenance rates that are remarkably improved. But, the maintenance rates of the battery capacities in FIG. 12, measured with the test batteries maintained at 60° C. degrees, show a proportional reduction of the battery capacity. The thin type battery of a lithium ion rechargeable battery type shows the same tendency as that shown in FIG. 12.

The thin type battery of the present invention does not specify the structure of the sealing part of the laminated sheathing in the first and second embodiments. As shown in the FIG. 13, the laminated sheathing overlaps and heat seals the laminated film 135A along the entire circumference of the electricity generating element 137, and it is possible to have a structure obtained by folding and gluing four heat welded overlapped parts on the upper face of the electricity generating element 137. The thin type battery shown in FIG. 13 has a primary sealing part 134A, extending vertically in FIG. 13, and a secondary sealing part 134B extending in a right-left direction, around the electricity generating element 137. In the thin type battery having this structure, the terminal collectors 136 are bent, together with the overlapping portions that have been heat welded and extend outwardly, as shown in FIG. 14. In this figure, the positive electrode is numbered 131, the negative electrode is numbered 132, the electrolytic layer is numbered 133, and the laminated sheathing is numbered 134.

Figure 15:
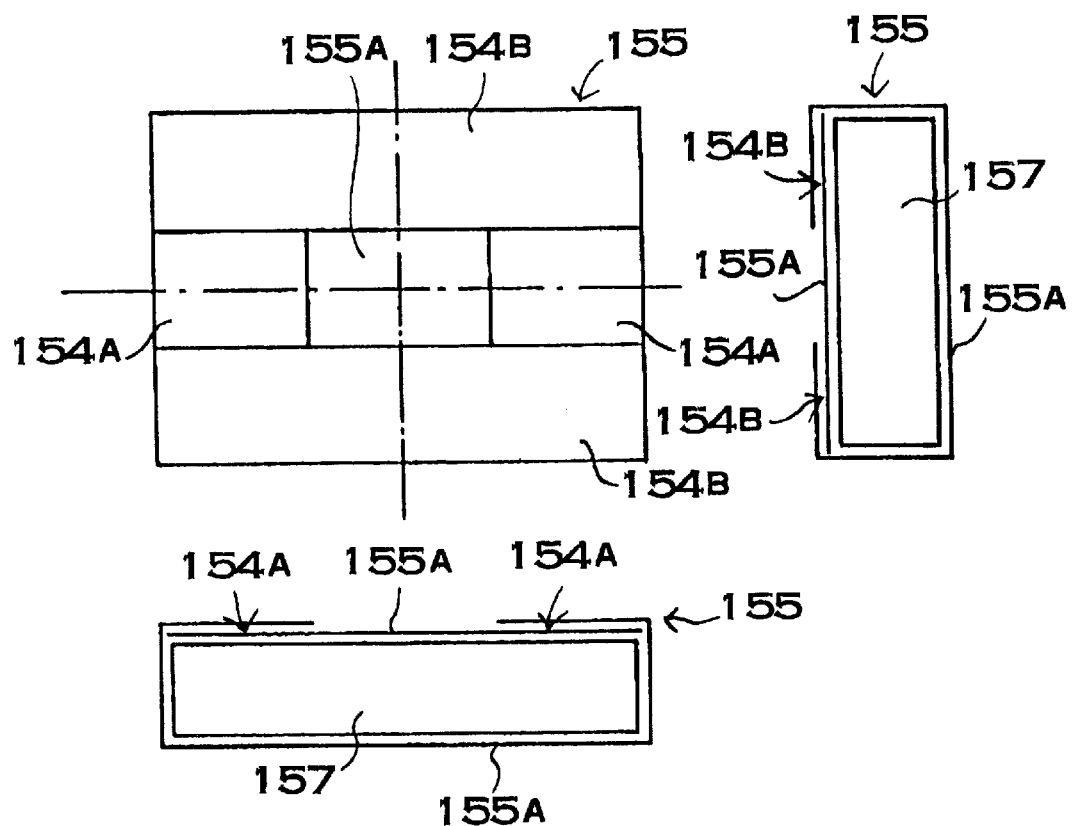
FIG. 15 is a plan view and a cross-sectional view of a thin type battery constructed in accordance with a further embodiment of the present invention.
Figure 16:
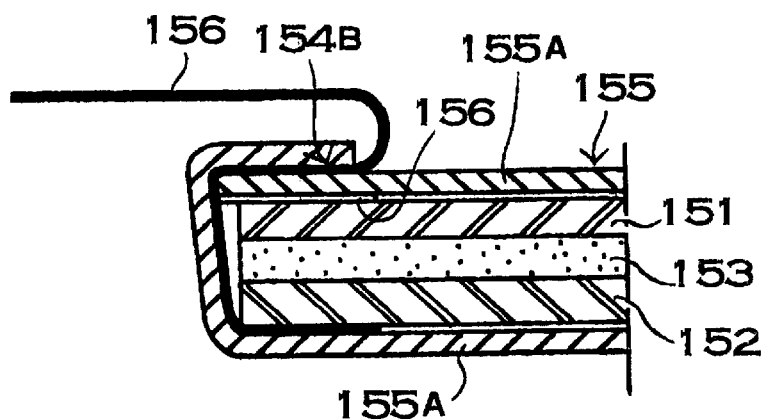
FIG. 16 is a cross-sectional view of the collector terminal part of the thin type battery shown in FIG. 15.

Furthermore, as shown in the FIG. 15, in the thin type battery of the present invention, it is also possible to fold and heat seal the laminated film 155A overlapping at the lower face of the electricity generating element 157 at the surface of the laminated film 155A overlapping at the upper face of the electricity generating element 157. The thin type battery shown in this figure has a primary sealing part 154A which extends vertically in FIG. 15, and secondary sealing parts 154B extending in a right-left direction, around the electricity generating element 157. As shown in FIG. 16, the collector terminals 156 protrude outwardly from between opposing surfaces of the laminated film 155A overlapping over the electricity generating element 157. In FIG. 16, the positive electrode is numbered 151, the negative electrode is numbered 152, the electrolytic layer is numbered 153, and the laminated sheathing is numbered 155.

Figure 13:
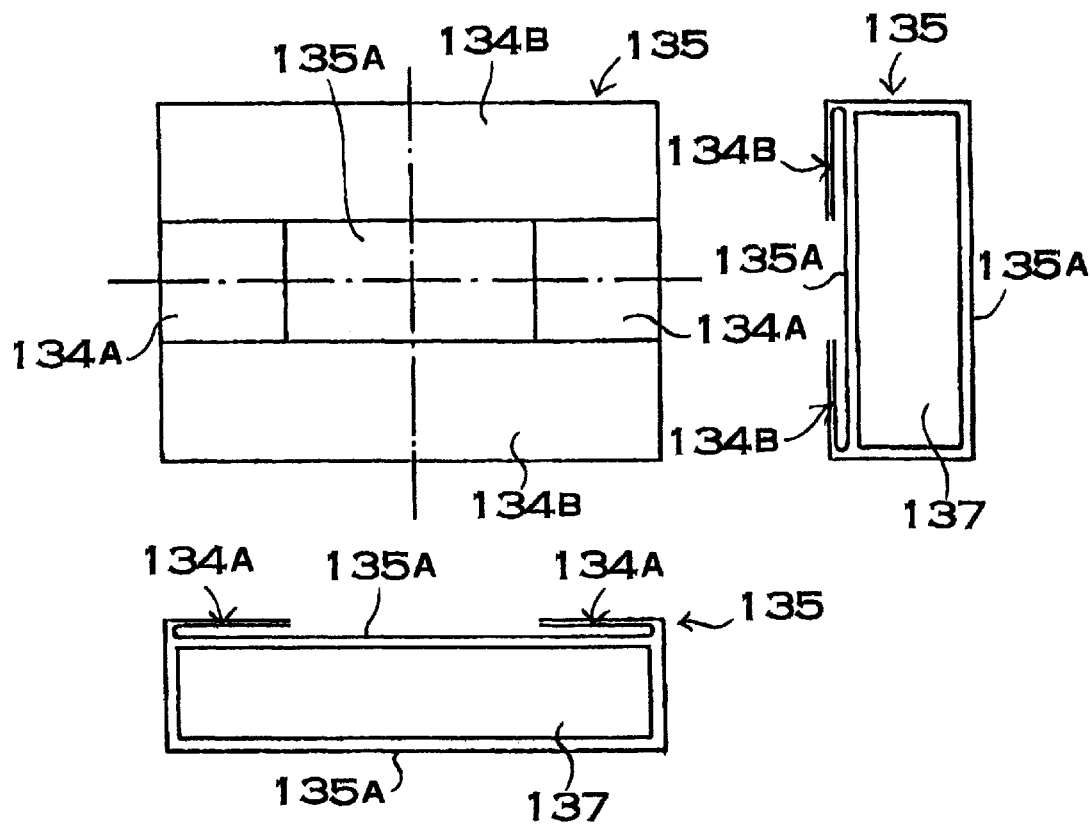
FIG. 13 is a plan view and a cross-sectional view of thin type battery constructed in accordance with another embodiment of the present invention.
Figure 14:
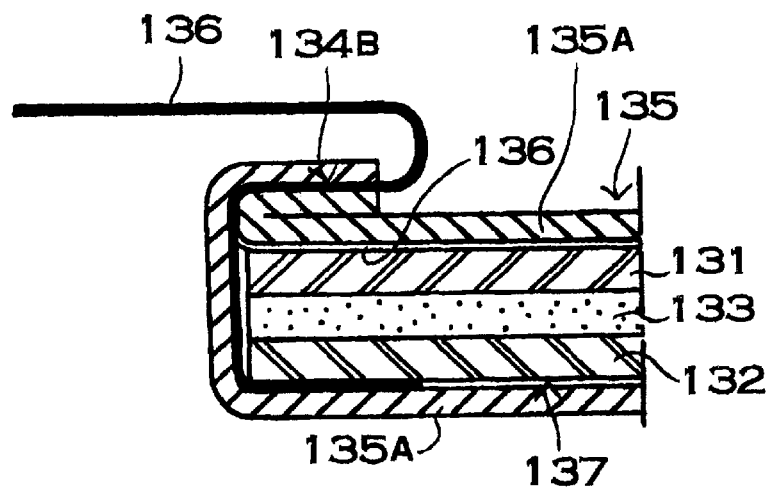
FIG. 14 is a cross-sectional view of the collector terminal part of the thin type battery shown in FIG. 13.

As shown in FIG. 10 and FIG. 13, in the structure where the heat welded overlapping part of the laminated film is folded over the upper face of the electricity generating element and glued to the upper face of the laminated film, it is possible to glue by heat welding or to glue using an adhesive substance the heat welded laminated film and the laminated film at the upper surface of the electricity generating element. Especially, even if the gluing of the heat welded laminated film and of the laminated film at the surface of the electricity generating element is insufficient, it can be simply glued because moisture etc. cannot enter the interior of the laminated sheathing.

Figure 17:
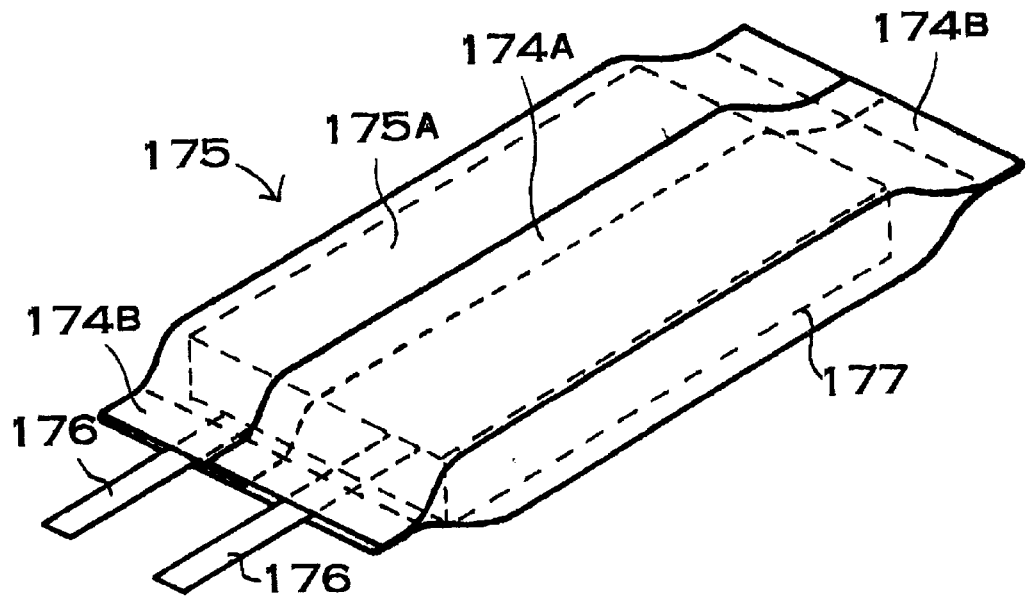
FIG. 17 is a perspective view of a thin type battery constructed in accordance with a further embodiment of the present invention.

Furthermore, in the thin type battery of the present invention, as shown in FIG. 17, it is possible to locate the primary sealing part 174A of the laminated sheathing 175 at the surface of the electricity generating element 177 and to locate the secondary sealing parts 174B so as to extend out from opposite ends of the electricity generating element 177. The thin type battery of this type is manufactured according to the process described below.

(1) The laminated film 175A is bent at both sides of the electricity generating element 177, so as to form a tubular shape and overlapped over the upper surface of the electricity generating element 177, and the overlapping part is heat welded so as to form the primary sealing part 174A.

(2) Then the electricity generating element 177, constructed in advance in an argon atmosphere, is introduced into the laminated film 175A that has been heat welded into a cylindrical shape. The electricity generating element 177 is the same as that used in the first embodiment. The laminated film 175A is formed so that the collector terminals 176 of the positive electrode and the negative electrode are crimped or sandwiched at one of the secondary sealing parts 174B. Initially only the secondary sealing part 174B that crimps the collector terminals 176 is heat sealed, while the secondary sealing part 174B that does not crimp the collector terminals 176 is not initially heat sealed. The secondary sealing parts 174B are formed so as to protrude from opposite ends of the electricity generating element 177.

When the thin type battery is a lithium ion rechargeable battery, after having crimped the collector terminals in one of the secondary sealing parts, the pouch is filled with electrolyte. Thus, when crimping the collector terminals in one of the secondary sealing parts, the electrolyte is not present. For this reason, there is no risk of miss-gluing due to the electrolyte when crimping the collector terminals.

(3) By sealing the secondary sealing part 174B, that does not crimp the collector terminals 176, the laminated film 175A is airtightly sealed. In the case of the lithium ion rechargeable battery, it happens that the electrolyte impedes the sealing of the secondary sealing part. To prevent this drawback, the laminated film is sealed after having removed the electrolyte that was spilled on the depositing area. The electrolyte of the depositing area is wiped with a cloth or a rag, or is removed with a pressurized gas such as air etc.

Figure 18:
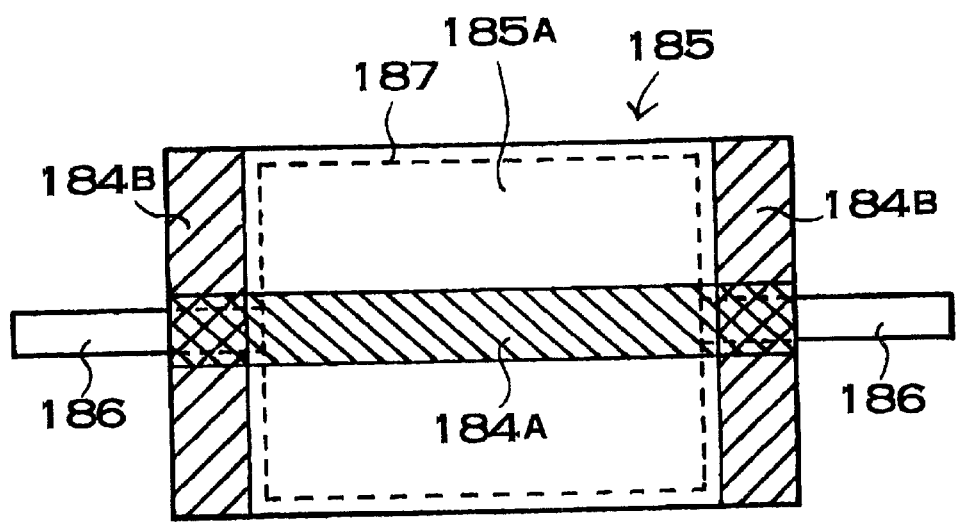
FIG. 18 is a plan view of a thin type battery constructed in accordance with another embodiment of the present invention.

The collector terminals 176 of the positive electrode and the negative electrode of the thin type battery are crimped in one of the secondary sealing parts 174B and protrude outwardly therefrom. As shown in FIG. 18, the collector terminals of the positive electrode and the negative electrode can separately extend through different secondary sealing parts 184B. In FIG. 18, reference numeral 185 refers to the laminated sheathing, 185A refers to the laminated film, 184A refers to the primary sealing part, 184B refers to the secondary sealing part, 186 refers to the collector terminals, 187 refers to the electricity generating element.

Figure 19:
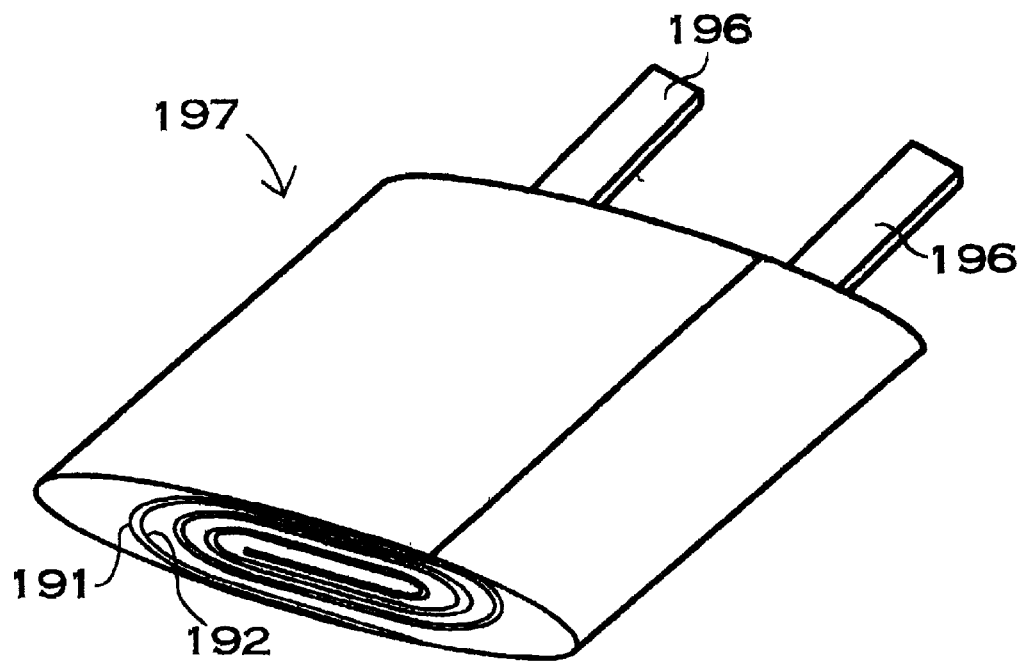
FIG. 19 is a perspective view showing an example of the electricity generating element of the thin type battery.
Figure 20:
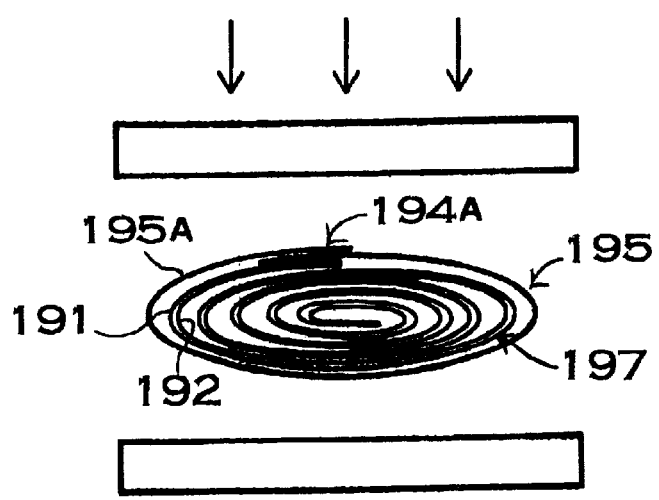
FIG. 20 is a front view showing a pressed condition of the laminated sheathing with the built-in electricity generating element shown in FIG. 19.

Furthermore, the electricity generating element to be introduced into the sealed chamber of the laminated sheathing, can also have the structure of flat positive and negative electrodes overlapping in plural layers, but as shown in FIG. 19, the overlapping materials of the positive electrode 191 and the negative electrode 192 can also have the structure of a spiral shaped roll. The collector terminals 196 are electrically connected to the positive electrode 191 and to the negative electrode 192. As shown in FIG. 20, the thin type battery that can employ the spiral shaped electricity generating element 197, includes the electricity generating element 197 inside of the laminated sheathing 195 which is connected in a tubular shape by sealing the laminated film 195A at the primary sealing part 194A. Also, the sheathing can be pressed from both sides in order to obtain a thin form.

Furthermore, as shown in the FIGS. 21 to 28, the thin type battery of the present invention can be manufactured by the following process.

Figure 21:
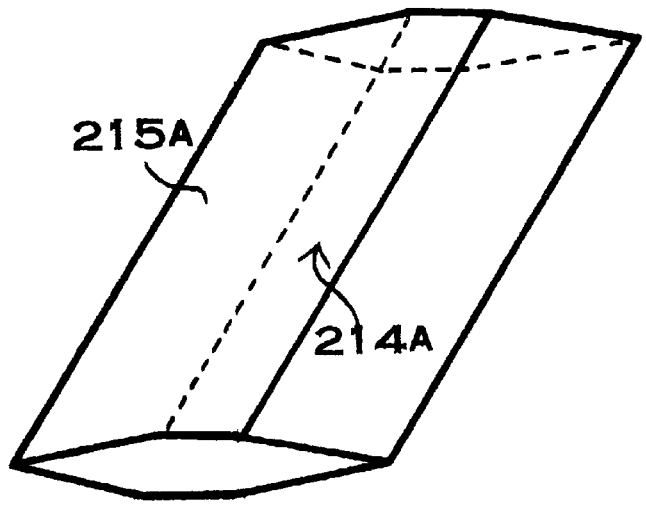
FIG. 21 is a perspective view showing the manufacturing process of the thin type battery of another embodiment of the present invention.

(1) The laminated film 215A is bent on both sides into a tubular shape and opposite end portions are overlapped and the overlapping parts are heat welded as shown in FIG. 21. A laminated film 215A with the same structure, as in the second embodiment, is used. In this process, the laminated film 215A is heat sealed at the primary sealing part 214A so as to connect the laminated film 215A in a tubular shape.

Figure 22:
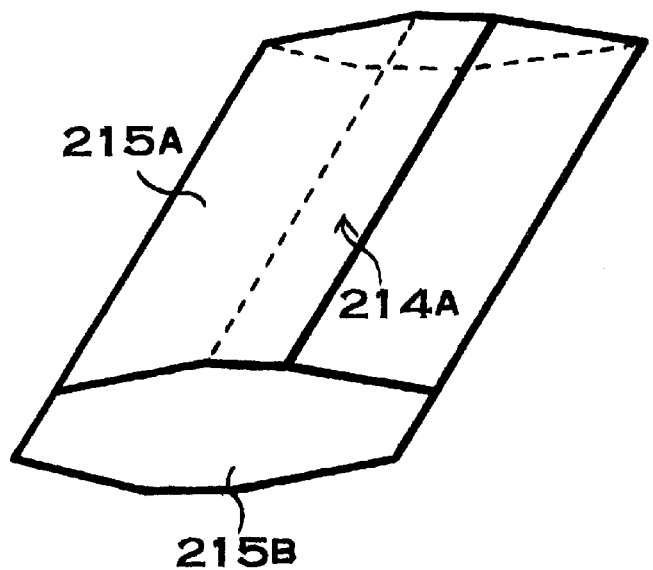
FIG. 22 is a perspective view showing the manufacturing process of the thin type battery of another embodiment of the present invention.

(2) As shown in FIG. 22, one of the edges of the laminated film 215A is removed by cutting, and the other edge that is not cut becomes flap 215B.

Figure 23:
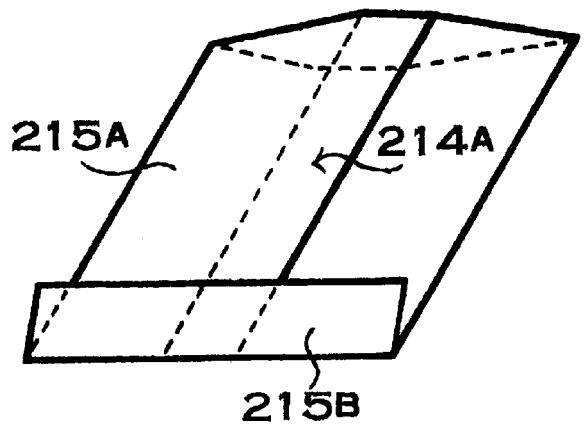
FIG. 23 is a perspective view showing the manufacturing process of the thin type battery of another embodiment of the present invention.

(3) As shown in FIG. 23, the flap 215B is folded through 180 degrees and overlapped to tightly fit on a surface of the laminated film 215A at the cut side.

Figure 24:
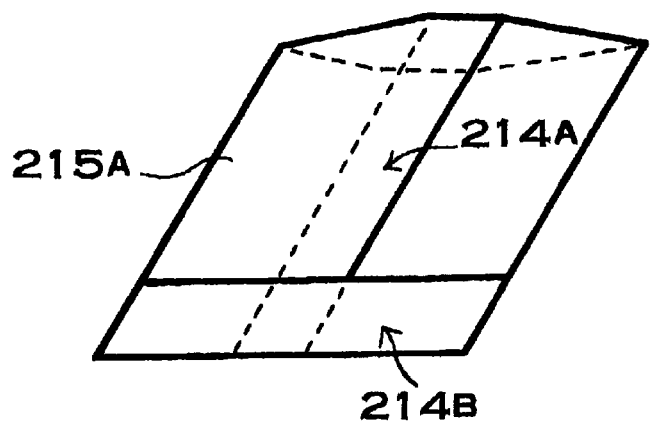
FIG. 24 is a perspective view showing the manufacturing process of the thin type battery of another embodiment of the present invention.

(4) As shown in FIG. 24, the overlapping part is heat welded and sealed so as to provide a bag-like structure. At this time, a thin metallic mold is inserted into the laminated film 215A, to prevent heat sealing of opposing surfaces of the laminated film 215A. The overlapping areas are crimped in a pressed and heated condition by means of the metallic mold and an outer metallic mold pressing the flap 215B. By this process, the heat welded part becomes the secondary sealing part 214B of the side that does not crimp the collector terminals.

Figure 25:
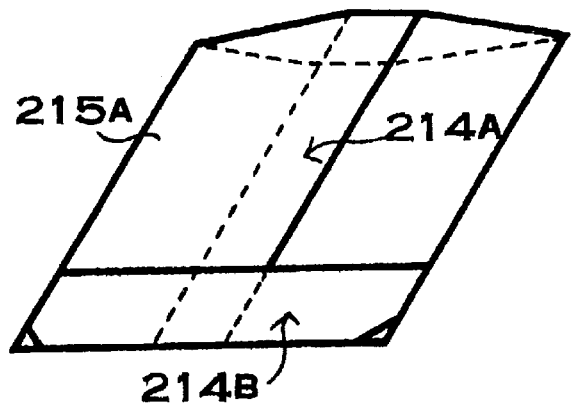
FIG. 25 is a perspective view showing the manufacturing process of the thin type battery of another embodiment of the present invention.

(5) Taking the thin metallic mold out of the bag-shaped laminated film 215A, as shown in FIG. 25, the two corners of the folded and deposited secondary sealing part 214B, are heat welded. The laminated film 215A located at the front and back faces is heat welded. This process is performed so as to reinforce the corners of the folded and sealed secondary sealing part 214B and also to tightly seal this area in order to prevent electrolyte from leaking.

Figure 26:
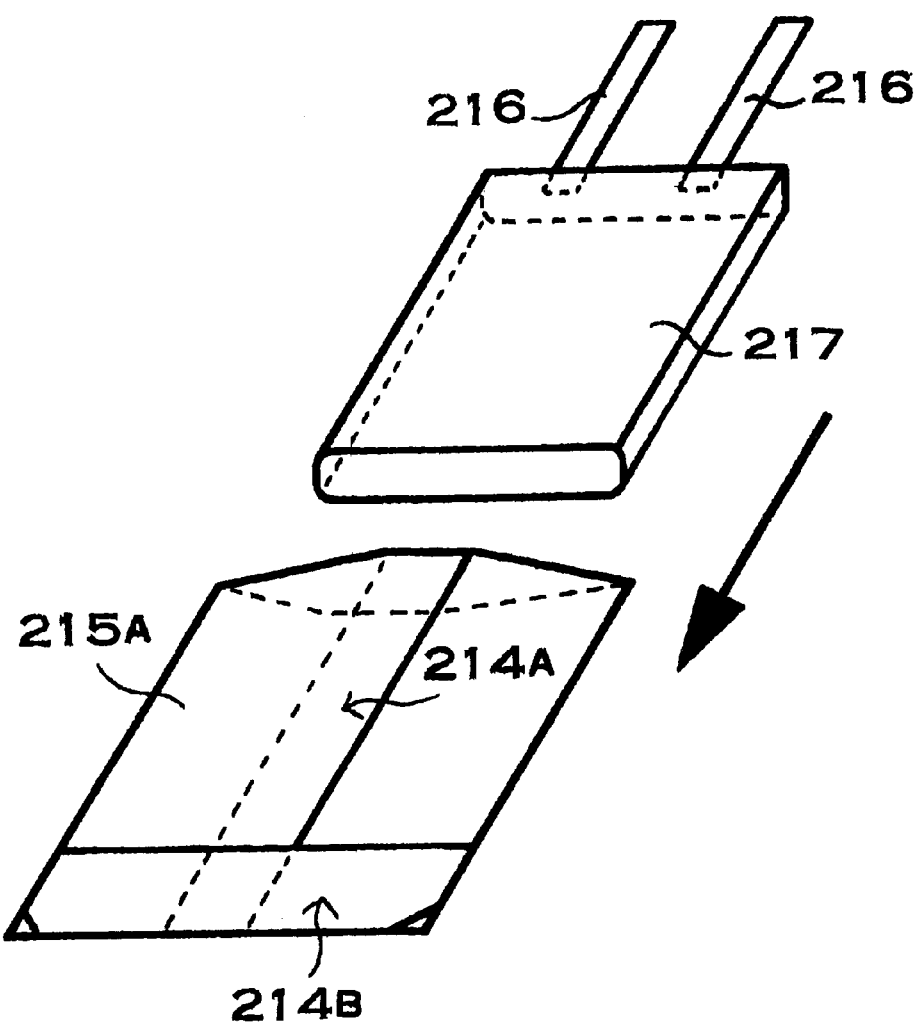
FIG. 26 is a perspective view showing the manufacturing process of the thin type battery of another embodiment of the present invention.
Figure 27:
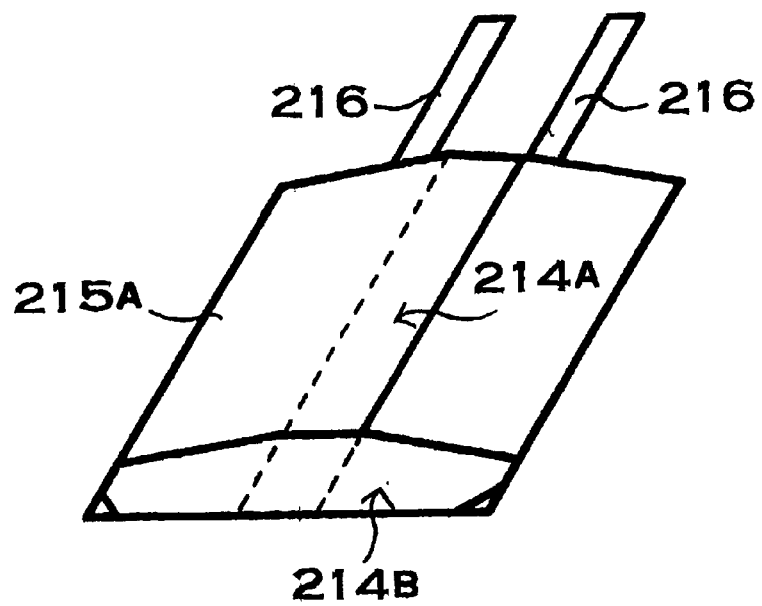
FIG. 27 is a perspective view showing the manufacturing process of the thin type battery of another embodiment of the present invention.

(6) As shown in FIG. 26 and in FIG. 27, the electricity generating element 217, constructed in advance in an argon atmosphere, is inserted into the formed pouch. At this time, the primary sealing part 214A is located at an upper surface of the electricity generating element 217 and the collector terminals 216 protrude from the open end of the pouch.

Figure 28:
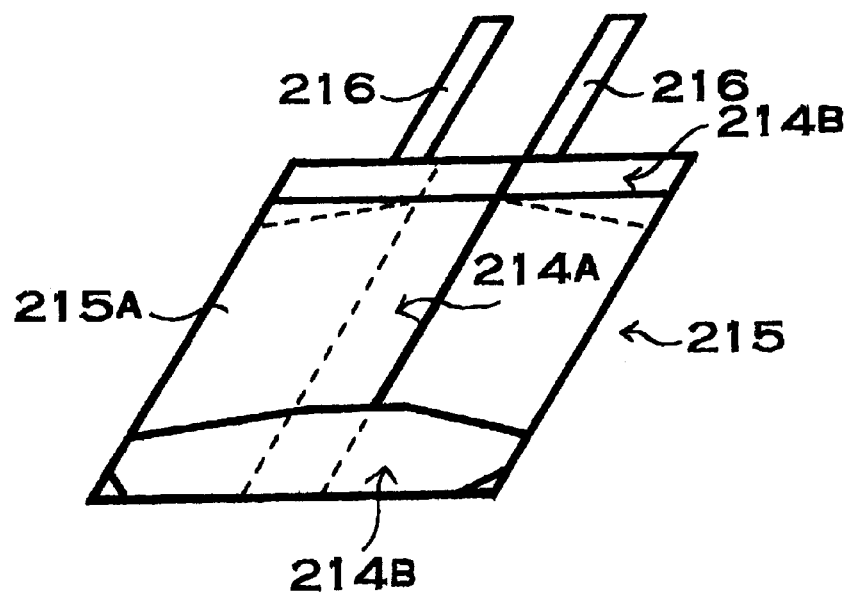
FIG. 28 is a perspective view showing the manufacturing process of the thin type battery of another embodiment of the present invention.

(7) After having filled the pouch with electrolyte, the collector terminals 216 are, as shown in the FIG. 28, crimped between the two opposing surfaces of the laminated film 215A, and the overlapping areas are heat welded. The heat welded area becomes the secondary sealing part 214B at the side crimping the collector terminals 216. The laminated film 215A is sealed after having removed any electrolyte spilled on the part to be sealed.

The thin type battery manufactured according to the above-described process, can realize an overall thin laminated sheathing with a sealed tubular shape. Furthermore, it is characterized in that the electrolyte is prevented from leaking outside through the folded part of the laminated film 215A because the corners of the secondary sealing part 214B of the side that does not crimp the collector terminals are heat welded.

Furthermore, in the thin type battery of the present invention, the inner face of the secondary sealing part that crimps the collector terminals, can also be airtightly sealed by spreading an adhesive material.

The secondary sealing part that is to be glued by means of an adhesive material, has the advantage of sealing without any gaps because the adhesive material fills up the interval between the collector terminals and the laminated film.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A thin battery comprising:
    a sheathing comprising a laminated film configured to form an airtight sealed chamber;
    an electricity generating element disposed in said sealed chamber, said electricity generating element having a positive electrode, a negative electrode, an upper surface, and a lower surface,
    wherein said sheathing has a primary sealing portion formed by a first pair of opposite edge portions of said laminated film which are overlapped and adhered together over one of said upper and lower surfaces of said electricity generating element to form an overlapped laminated film,
    a first secondary sealing portion formed by adhering together opposing surfaces at a first end of said overlapped laminated film, and
    a second secondary sealing portion formed by adhering together opposing surfaces at a second end of said overlapped laminated film,
    wherein said first and second secondary sealing portions are disposed at opposite ends of said primary sealing portion and extend perpendicularly with respect to said primary sealing portion, and said first secondary sealing portion is located outwardly of the periphery of said electricity generating element, and said second secondary sealing portion is disposed over said primary sealing portion and over one of said upper and lower surfaces of said electricity generating element; and
    collector terminals connected to said positive electrode and said negative electrode, respectively,
    said collector terminals extending from said electricity generating element outwardly of said sealed chamber, wherein said collector terminals are sealed in an airtight manner at said first secondary sealing portion.

2. A thin battery as claimed in claim 1, wherein said primary sealing portion extends in a linear fashion over the upper surface of said electricity generating element.

3. A thin battery as claimed in claim 2, wherein said primary sealing portion extends over a central portion of the upper surface of said electricity generating element.

4. A thin battery as claimed in claim 1, wherein said sheathing has an exterior shape which is in the form of a rectangle, and a length of said primary sealing portion is greater than a length of said either of secondary sealing portions.

5. A thin battery as claimed in claim 1, wherein said second secondary sealing portion includes corner portions, and the corner portions are heat welded.

6. A thin battery as claimed in claim 1, wherein said electricity generating element comprises a flat positive electrode and a flat negative electrode, said positive and negative electrodes being laminated together.

7. A thin battery as claimed in claim 1, wherein said thin battery is a lithium ion rechargeable battery.

8. A thin battery as claimed in claim 1, wherein said second secondary sealing portion is formed by a portion protruding from a second end of said overlapped laminated film, and wherein said protruding portion is adhered over said primary sealing portion.

9. A thin battery as claimed in claim 1, wherein said laminated film comprises an aluminum film, and a pair of thermally deformable plastic films provided on opposite side of said aluminum film, respectively.

10. A thin battery as claimed in claim 9, wherein adhesive material is provided between said collector terminals and an inner surface of said sheathing.

11. A thin battery as claimed in claim 1, wherein said thin battery is a lithium polymer rechargeable battery.

12. A thin battery comprising:

a sheathing comprising a laminated film configured to form an airtight sealed chamber;

an electricity generating element disposed in said sealed chamber, said electricity generating element having a positive electrode, and a negative electrode, an upper surface and a lower surface, said sheathing having a first primary sealing portion, a second primary sealing portion, and a secondary sealing portion, said first primary sealing portion being formed by a first edge of said laminated film that is overlapped and opposing surfaces of said laminated film adhered together, wherein said first primary sealing portion is positioned over one of said upper and lower surfaces of said electricity generating element, said second primary sealing portion being formed by a second edge of said laminated film which is overlapped and opposing surfaces of said laminated film adhered together, wherein said second primary sealing portion is positioned over one of said upper and lower surfaces of said electricity generating element, wherein said first and second edges are parallel to each other, and said secondary sealing portion being formed by adhering together opposing surfaces of a third edge and a fourth edge of said laminated film, said secondary sealing portion extending perpendicularly with respect to said first and second primary sealing portions; and collector terminals connected to said positive electrode and said negative electrode, respectively, said collector terminals extending from said electricity generating element outwardly of said sealed chamber, at least one of said collector terminals being interposed in an airtight manner between the opposing surfaces of said third edge and said fourth edge of said laminated film.

13. A thin battery comprising:

a sheathing comprising a laminated film configured to form an airtight sealed chamber;

an electricity generating element disposed in said sealed chamber, said electricity generating element having a positive electrode, a negative electrode, an upper surface, and a lower surface, wherein said sheathing has a primary sealing portion formed by a first and second opposite edges of said laminated film, which are overlapped and adhered together over one of said upper and lower surfaces of said electricity generating element, a first secondary sealing portion formed by adhering together opposing surfaces of a third edge of said laminated film, and a second secondary sealing portion formed by adhering together opposing surfaces of a fourth edge of said laminated film, wherein said first and second secondary sealing portions are disposed at opposite ends of said primary sealing portion and extend perpendicularly with respect to said primary sealing portion, and said first and second secondary sealing portions are located over one of said upper and lower surfaces of said electricity generating element; and collector terminals connected to said positive electrode and said negative electrode, respectively, said collector terminals extending from said electricity generating element outwardly of said sealed chamber, wherein one of said collector terminals extends through said first secondary sealing portion.

14. A thin battery as claimed in claim 13, wherein the other of said collector terminals extends through said second secondary sealing portion.

* * * * *